United States Patent [19]  [11] 3,844,454
Buchtel  [45] Oct. 29, 1974

[54] MEASURED DISPENSER

[76] Inventor: Dean H. Buchtel, 1510 Menlough Ave., Canton, Ohio 44708

[22] Filed: July 6, 1972

[21] Appl. No.: 269,388

[52] U.S. Cl.................. 222/453, 222/476, 222/500
[51] Int. Cl............................................. G01f 11/38
[58] Field of Search .......... 222/450, 453, 455, 456, 222/476, 496, 497, 500

[56] References Cited
UNITED STATES PATENTS
2,013,440  9/1935  Gessler ........................... 222/476 X
2,699,885  1/1955  McClure ......................... 222/476 X
2,828,893  4/1958  Stewart .............................. 222/453
3,146,919  9/1964  Chappell......................... 222/500 X Primary Examiner—Robert B. Reeves
Assistant Examiner—Thomas F. Kocovsky
Attorney, Agent, or Firm—Oldham & Oldham Co.

[57] ABSTRACT

The invention relates to a unique measuring dispenser whereby particular quantities of a given granular or liquid substance may be dispensed with ease. The invention is such that it is readily insertable into a mass reservoir containing a mass quantity of the substance to be dispensed. The invention achieves the dispensing of a predetermined fixed quantity of a given substance by use of apparatus comprising a measuring unit, a single movable element, and a cap.

6 Claims, 7 Drawing Figures

MEASURED DISPENSER

It is well known to the users of commercial products which exist in liquid or granular form that the obtaining of a small measured quantity from a larger mass quantity requires the transfer of the substance from a larger mass container to a smaller measuring container by means of pouring, dipping, or scooping. However, such approaches to acquiring particular measured quantities from larger mass quantities generally proves to be inaccurate, messy, and the cause of damage due to spillage. To avoid these problems, containers have been designed which themselves possess regulatory means whereby particular predetermined fixed quantities may be dispensed when the proper procedure in manipulating the container is followed. However, known apparatus of this type has proven itself to have certain unsatisfactory characteristics. In general, the known apparata are mechanically complicated; that is, they rely on springs or other mechanical means to set or reset the device. The mechanical complexity of such systems has made them expensive to construct, and hence their use in "throw-away" type containers has been prohibitive. Further, most known systems require the application of some external force on the apparatus by the user in such a manner as to activate the measuring unit. The application of such force is not only an undesirable exercise by the user, but, when applied improperly, may cause the mechanical apparatus to jam thus destroying the utility of the unit.

Therefore, it is an object of the instant invention to present a measuring unit which may be readily inserted into a mass reservoir wherein a large quantity of a particular granular or liquid substance may be stored, and whereby particular quantitative amounts of such substance may be dispensed with ease.

Another object of the invention is to present apparatus capable of dispensing particular measured quantities of a given substance which is mechanically simplistic, inexpensive to construct, adaptable to use in the "throw-away" market, and which is not susceptible to jamming in that no external force need be applied to the dispensing system.

The aforesaid objects of the invention and other objects which will become apparent as the description proceeds are achieved by apparatus comprising a measuring unit having a measuring cavity, an inlet port, and an outlet port; a plunger which operates within the confines of the inlet port, the position of which causes and restricts the flow of the given substance into and out of the measuring unit cavity; and a removable cap providing both a seal over the outlet port and an obstruction to the motion of the plunger.

For a better understanding of the invention reference should be made to the accompanying drawings wherein.

Figure 1:
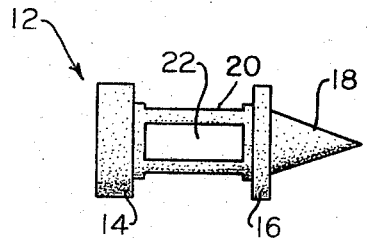
FIG. 1 is an elevational view of the plunger used within the apparatus.

Referring now to the drawings and more paritcularly FIG. 1, an appreciation of the structure of the only moving part of the instant invention may be had. It should be understood that this plunger, designated generally by the numeral 12, may take any one of numerous shapes and still achieve the desirable purpose consistent with the teachings of the invention. However, the preferred embodiment of the invention requires that the plunger 12 consists primarily of a cylinder 20 characterized by the presence of one or more troughs or slots 22. Attached to each end of the cylinder 20 are discs 14 and 16 which may or may not be of equal size, and attached to the end of disc 16 is a cone or extension 18. The preferred embodiment of the invention requires that the surfaces of the discs 14 and 16 be flat, and that the cylinder 20, the discs 14 and 16, and the cone or extension 18 be situated such that their centers all lie on the same line. It should be noted that although the preferred embodiment of the invention requires that the cylinder 20 be characterized by the presence of four troughs or slots 22, the cylinder 20 may have any number of troughs or slots 22 depending upon considerations which will be made apparent hereinafter.

By reference to FIG. 1 it may be further noted that the troughs or slots 22 are formed in the cylinder 20 by effectively removing a portion of material from the cylinder 20. It should be appreciated that it is generally desirable that the troughs 22 be radially aligned with reference to the center line of the cylinder 20; that is, if the troughs or slots 22 were of sufficient depth they would pass through the center line of the cylinder 20 and become thru ports.

For the preferred embodiment of the invention in order to achieve a flow passage of substantially uniform diameter throughout its length, the cylinder is .495 inches in diameter, each trough or slot is ¼ inches wide and 11/16 inches long and runs thru the .495 inch diameter of cylinder. The circumferential distance or land area between adjacent troughs or slots is between 7/64 and ⅛ inches. The bearing surface 34 is .500 inches in diameter and ¼ inches in length. The overall length of the cylinder is 13/16 inches so the portions at each end of the troughs of full cylindrical diameter are about 1/16 inch. For assembly purposes either of the flanges 14 or 16 may be attached after the cylinder 20 is positioned through the bearing surface 34 of the sleeve defined by flanges 36 and 38. Preferably, the outer end of each flange 36 and 38 has a slight chamfer indicated by numerals 36a and 38a in FIG. 2. The entire unit will preferably be molded from a suitable plastic material.

Figure 2:
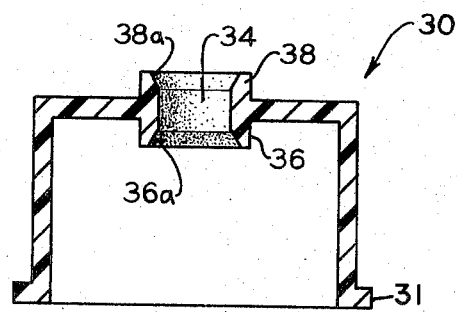
FIG. 2 is a cross sectional view of a measuring unit.

Referring now to FIG. 2, an appreciation of the fundamental structure of the measuring unit of the instant invention may be had. This figure shows a cross-sectional view of exactly one-half of the measuring unit designated generally by the numeral 30. The measuring unit 30 is characterized by a flanged lip 31 about the periphery of an outlet port through which the measured quantity of the desired substance will eventually pass. Diametrically opposed to the outlet port is an inlet port formed by the presence of a flange 36 and a flange 38, the former extending into the measuring cavity of the measuring unit 30 and the latter extending outwardly therefrom so as to constitute a part of the external surface of the measuring unit 30. The flanges 36 and 38 combine to form a sleeve, the inner surface of which provides a bearing surface 34 upon which the plunger 22 may travel.

Figure 3:
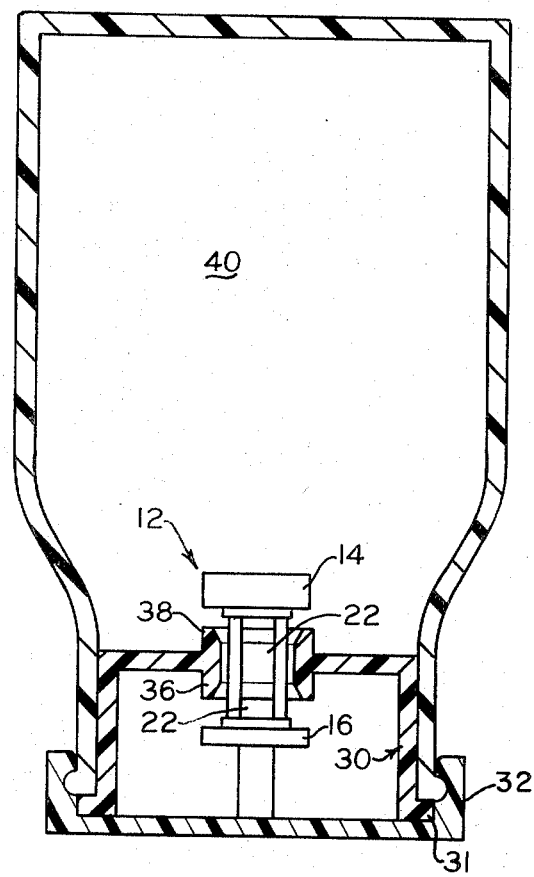
FIG. 3 is a cross sectional view illustrating the relationship between the measuring unit and plunger and a mass reservoir containing the substance to be dispensed.
Figure 5:
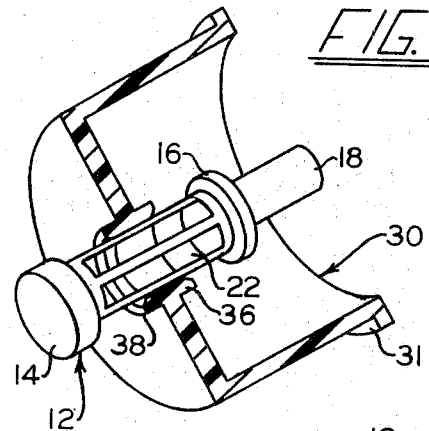
FIG. 5 illustrates the cross sectional view of the invention.

Referring now to FIG. 3 the basic operation of the measuring unit 30, and the plunger 12 to achieve the desired purpose of the invention may be understood. Here, the measuring unit 30 has been placed into an opening in a mass reservoir 40. The plunger 12 is positioned in the sleeve created by the presence of the flanges 36 and 38, the plunger being capable of moving vertically on the bearing surface 34. The flanged lip 31 of the measuring unit 30 not only helps to provide a seal between the mass reservoir 40 and the measuring unit 30 but also may be used as a lip upon which a removable cap 32 may be sealed. In normal operations of the instant invention the mass reservoir 40 would contain a large volume of a liquid or granular substance. When the apparatus is in the position shown in FIG. 3 the substance in the mass reservoir 40 will have a tendency to flow through the troughs 22 in the plunger 12 past the sleeve created by the flanges 36 and 38 and into the measuring cavity of the measuring unit 30. This process will continue until the measuring cavity is filled.

It should now be appreciated that to achieve the ultimate benefit of the instant invention the troughs or slots 22 should be carefully designed. Ideally, the troughs or slots 22 should be of such size and so positioned on the cylinder 20 of the plunger 12 that when the apparatus is in the position as shown in FIG. 3 the opening created by a trough or slot 22 to the mass reservoir 40 is equal in size to the opening created by the trough of slot 22 in the measuring cavity of the measuring unit 30. The size of these openings should be equivalent to the cross-sectional area of the passageway created between the trough 22 and the sleeve created by the flanges 36 and 38. That is, the passageways created by the troughs 22 for moving substance from the mass reservoir 40 to the measuring cavity of the measuring unit 30 should be of uniform size throughout the entire passageway. The uniformity of size is critical in the dispensing of granular substances so as to prevent jamming of the individual granules within the passageways. This uniformity of size is readily achievable by carefully selecting the size of the trough 22, the flange 36, and the flange 38. An even more desirable situation can be provided by designing the troughs 22 such that the opening on the mass reservoir 40 side of the plunger is smaller than the opening on the measuring cavity side of the plunger. If this disparity is provided for and if the troughs 22 are so designed that they uniformly increase in size from the smaller opening to the larger opening then it may be virtually guaranteed that there will be no jamming of granular substance within the passageways.

Alterations in the design of the preferred embodiment of the instant invention should be readily apparent. The measuring unit 30 may take any one of a myriad of shapes, that shape depending upon the chracteristics of the opening in the mass reservoir 40. The volume of the measuring cavity of the measuring unit 30 is of course dependent upon the substance to be dispensed and the standard quantity of that substance desired. It should further be noted that of course the plunger 12 need not be basically cylindrical in shape but may have any one of numerous shapes. The only critical criteria is that the inlet port within the confines of the sleeve created by the flanges 36 and 38 have cross-sectional dimensions substantially equal to the cross-sectional dimensions of the center portion of the plunger 12 taken without regard to the troughs 22. In other words, it is extremely important that the plunger 12 be designed so as to uniquely fit within the confines of the input port with consideration given for tolerances so as to allow the movement of the plunger within the input port.

Figure 4:
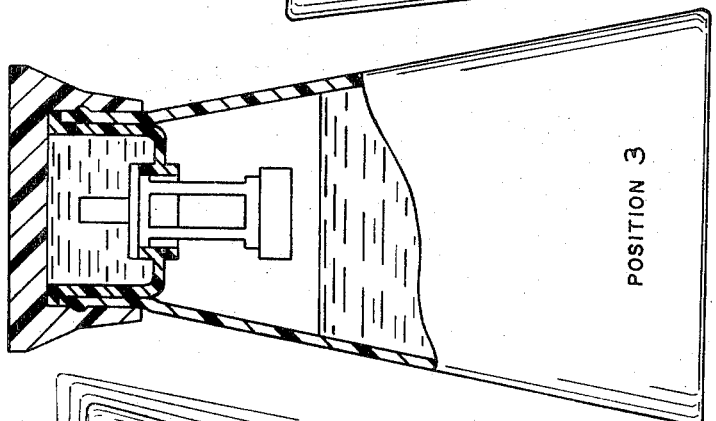
FIG. 4 illustrates the steps to be followed to achieve the purpose of the invention.

Now having an appreciation and general understanding of the structure and general use of the instant invention, reference may be made to FIG. 4 which illustrates the steps of operation of the apparatus of the invention to achieve the desired purpose. Position 1 illustrates the normal storage position of the entire unit. Note here that the measuring unit 30 is empty, the mass reservoir 40 is relatively full, and the disc 16 of the plunger 12 mates with the rim surface of the flange 36. Position 2 is achieved by inverting the position of the unit as shown in position 1. When the unit is inverted gravity forces the plunger 12 to seek a position of minimum potential energy whereby the cone or extension 18 of the plunger 12 comes in contact with the removable cap 32 which seals the measuring unit 30. The plunger is now in such a position that the troughs 22 are centered about the flanges 36 and 38 thus creating a passageway of uniform cross-sectional area between the mass reservoir 40 and the measuring unit 30 bypassing the sleeve created by the flanges 36 and 38. The unit is now agitated back and forth in a pendulum like motion for a short period of time (approximately 5 seconds) to allow the measuring unit cavity of the measuring unit 30 to fill to capacity, FIG. 2. After the measuring unit cavity is filled the container is then placed in position 3 which is similar to position 1 but for the fact that the measuring unit cavity is now full. Note that as the unit goes to position 3 gravity once again operates on the plunger 12 forcing the disc 16 onto the surface of the flange 36 causing a seal therebetween. When the substance to be dispensed is granular, the mating between the flat surface of the disc 16 and the rim of the flange 36 is sufficient to prevent any flow of the substance from the measuring unit cavity into the mass reservoir 40. When the substance to be dispensed is liquid then it can be appreciated that if the mating surfaces between the disc 16 and the rim of the flange 36 do not themselves make a perfect seal then any liquid which might occupy a space between the disc 16 and the rim of the flange 36 will, by surface tension, help to perfect that seal. Hence, it can be appreciated that in position 3 there exists two distinct quantities of the substance; a mass quantity contained in the mass reservoir 40 and a particular measured quantity contained in the measuring cavity of the measuring unit 30; the latter being now ready to be dispensed for whatever use intended. To dispense the measured quantity the removable cap 32 is removed from the measuring unit 30 and the unit is placed in position 4, which is substantially the same as that of position 2. However, with the removable cap 32 removed no contact is made with the cone or extension 18 of the plunger 12 and gravity hence pulls the plunger 12 into a position such that the disc 14 mates with the rim of the flange 38 such as to cause a seal preventing any further flow of the substance from the mass reservoir 40. The removable cap 32 being removed, the substance which was contained in the measuring cavity is then dispensed into whatever final container is intended for the final use of the substance. Note that the characteristics of the seal between the disc 14 and the rim of the flange 38 in position 4 is substantially the same as the seal existing between disc 16 and the rim of the flange 36 when the unit is in position 3.

Figure 6:
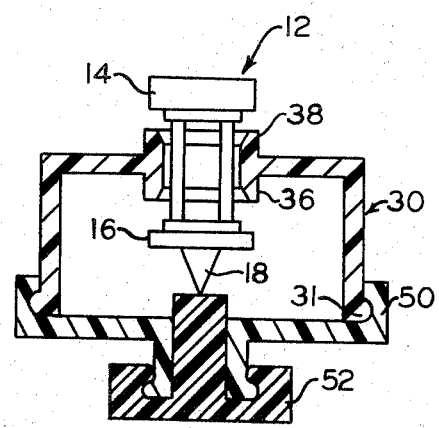
FIG. 6 illustrates some deviations from the preferred embodiment of the invention utilizing the unique composition of caps which are still within the teachings of the invention.

Of course, further changes may be made in the basic design in the preferred embodiment of the invention so as to achieve the ultimate in dispensing ease. A large outlet port such as the one covered by the removable cap 32 in FIGS. 3 and 4 would be quite acceptable in dispensing large quantities of substance such as laundry detergent. However, the dispensing of substances such as cough syrup, mouthwash, or dish detergent would dictate the use of a smaller outlet port for the final dispensing of the substance. FIG. 6 illustrates the apparatus required to achieve such a purpose. Here it can be seen that the measuring unit 30 and the plunger 12 are identical to those discussed earlier. However, the removable cap 32 has now been replaced by a combination of caps 50 and 52. Cap 50 serves to seal the measuring cavity of the measuring unit 30 at the flanged lip 31. The cap 52 serves the dual purpose of sealing the final output port and providing the means for making contact with the cone 18 of the plunger 12 and hence restricting the motion of the plunger so as to allow a flow of the substance from the mass reservoir into the measuring cavity. The caps 50 and 52 may be so designed such that when the cap 52 is removed the plunger 12 will partially restrict the flow in the output port and hence cause a smooth even flow of the substance to the final user.

It should be further realized that the number of troughs 22 placed in the plunger 12 will be chiefly determined by the size of the measuring cavity to be filled. If the measuring cavity is large, then a substantial number of troughs 22 will be required to fill the cavity in a reasonable amount of time.

It should be further understood that it is not critical that there be flanges 36 and 38 as required in the preferred embodiment. A seal could of course be accomplished by the mating of the discs 14 and 16 with the flat surface periphery of the input port. However, it is felt that the flanges 36 and 38 by providing a sleeve having a bearing surface 34 helps to more uniformly guide the vertical motion of the plunger 12 and the rims of the flanges 36 and 38, being elevated, have a tendency to provide a better seal.

Figure 7:
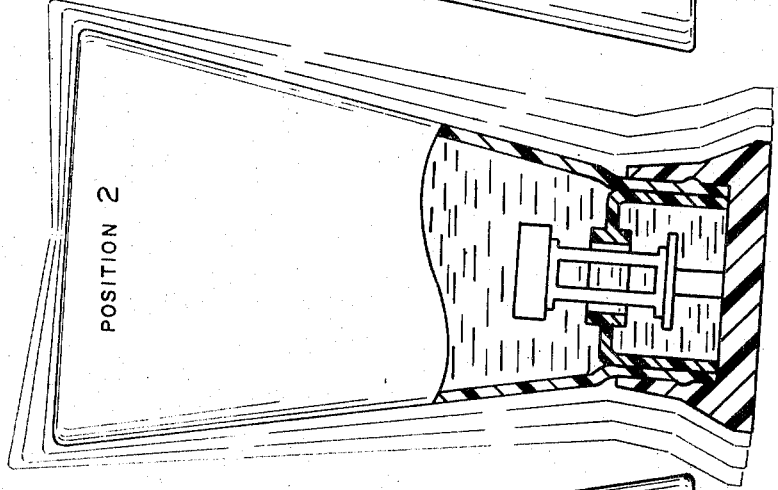
FIG. 7 illustrates an alternate design.
Figure 7:
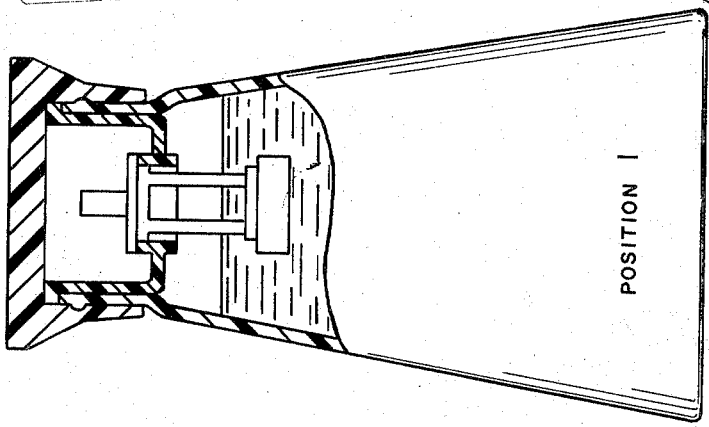
Figure 7:
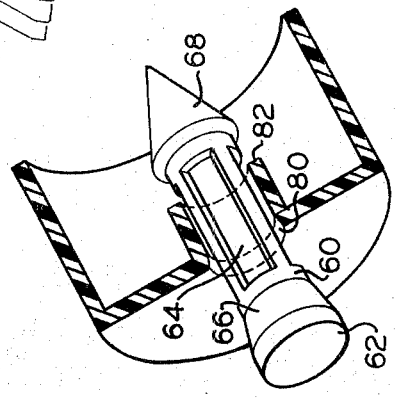

Brief mention might also be made here by reference to FIG. 7 to a slightly different approach to achieving the same purpose of the preferred embodiment. Here, it can be seen that the center portion of the plunger 60 is characteristically cylindrical with passageways provided by the planed areas 64. This approach is quite suitable for the passage of liquids, but, the passageway being non-uniform in size, is not acceptable for the passage of granular substances. Note that the seals on this plunger 60 are achieved by tapered end portions 66 and 68 mating with beveled portions of the measuring unit itself 80 and 82 respectively. The measuring unit 70 and plunger 60 illustrated in FIG. 7 are slightly more complicated than the preferred embodiment described hereinabove, due to the tapered and beveled portions thereof and have been shown only to illustrate a possible alteration from the preferred embodiment of the instant invention.

It should now be apparent that the objects of the instant invention have been achieved by the apparatus described hereinabove and that while in accordance with the Patent Statutes only the best known embodiment of the invention and slight variations thereof have been illustrated and described in detail, it should be understood that the invention is not limited thereto or thereby. Reference should be had to the appended claims in determining the true scope of the invention.

What is claimed is:

1. Apparatus for dispensing precise amounts of a given substance, comprising:
   a measuring unit being tubular in shape wherein a first end is totally open, having a flanged lip about the periphery thereof, and the second end is totally enclosed but for the presence of a sleeved tubular inlet port in the center thereof;
   a cap covering the first end of the measuring unit and sealing the flanged lip about the periphery, the cap providing a boundary for and thereby defining the volume of the measuring unit; and
   a plunger, positioned within the inlet port, having a cylindrical center portion with passage slots therein, a first end disk at one end of the center portion and a second end disk at the other end of the center portion, the end disks limiting the motion of the plunger within the inlet port and providing seals at the inlet port periphery, and a protrusion attached to the second end disk limiting, by contact with the cap, the motion of the plunger.

2. Apparatus for dispensing precise amounts of a given substance, comprising:
   a measuring unit having a measuring cavity, an inlet port, and an outlet port and of such shape as to be readily inserted into an opening in a mass reservoir such that the inlet port occupies a position within the mass reservoir, the outlet port occupies a position without the mass reservoir, and the measuring unit totally seals the periphery of the opening in the mass reservoir;
   an unbiased gravity-actuated plunger having a center portion with passage slots therein and operating within the inlet port such that at all times the plunger simultaneously occupies positions within the mass reservoir and the measuring unit cavity;
   a removable cap of such shape that it is capable of simultaneously sealing the outlet port and restricting the motion of the plunger within the inlet port; and wherein the plunger has first and second end portions at the ends thereof, the first end portion making contact with the removable cap and the periphery of the inlet port to restrict the movement of the plunger and allow the filling of the cavity and to further create a seal between the measuring unit cavity and the mass reservoir and the second end portion is functional to restrict the motion of the plunger toward the outlet port when the removable cap is removed and to further create a seal between the measuring unit cavity and the mass reservoir.

3. The apparatus according to claim 2 wherein the inlet port and outlet port are diametrically opposed.

4. The apparatus according to claim 2 wherein the measuring unit is characterized by:
- an outlet port of substantially the same size and shape as the opening in the mass reservoir;
- a flanged lip about the periphery of the outlet port such that when the measuring unit is inserted into the opening in the mass reservoir the flanged lip provides a seal about such opening; and
- a flange about the periphery of the inlet port, the flange being parallel to the axis of motion of the plunger within the inlet port so as to effectively create a sleeve within which the plunger may operate.

5. The apparatus according to claim 4 wherein the removable cap comprises a combination of two distinct caps such that a first cap totally covers and seals the outlet port of the measuring unit and a second cap restricts the motion of the plunger in the inlet port and seals an opening in the first cap.

6. The apparatus according to claim 4 wherein the flange about the periphery of the inlet port is of such nature as to extend equal distances into both the measuring cavity of the measuring unit and the mass reservoir.

* * * * *